(No Model.)
J. A. MARSH.
DOMESTIC OVEN.
No. 252,887.
Patented Jan. 31, 1882.
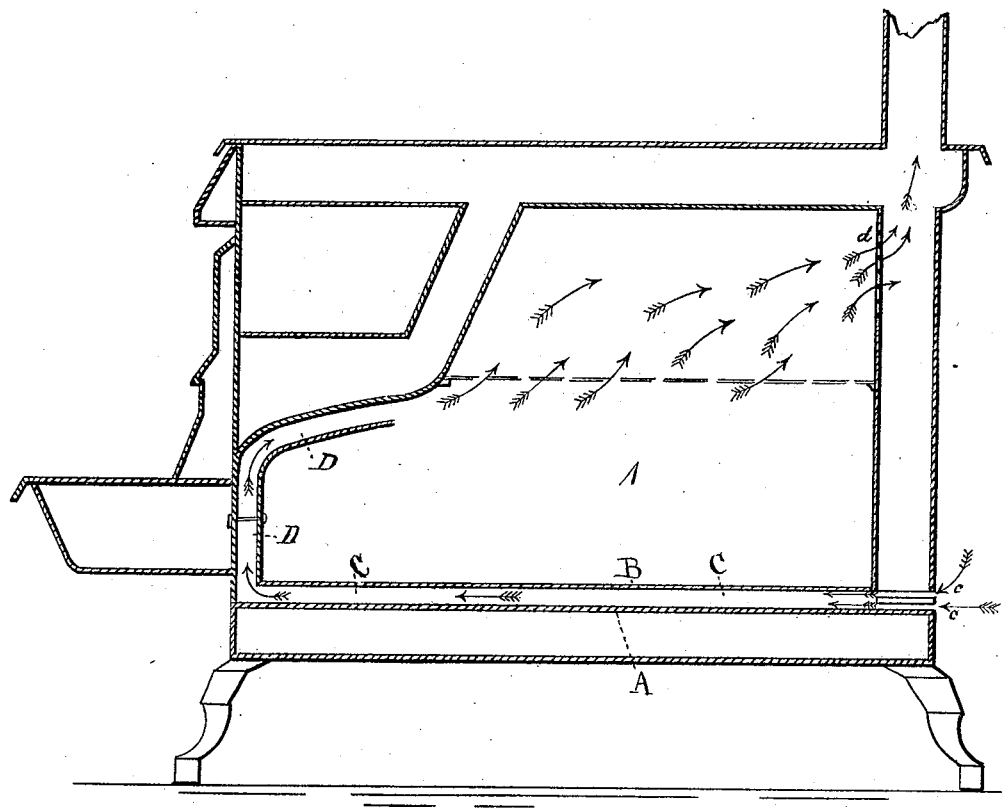
WITNESSES
INVENTOR
James A. Marsh
By Liggett & Liggett
ATTORNEYS

UNITED STATES PATENT OFFICE.

JAMES A. MARSH, OF CLEVELAND, OHIO.

DOMESTIC OVEN.

SPECIFICATION forming part of Letters Patent No. 252,887, dated January 31, 1882.

Application filed April 4, 1881. (No model.)

*To all whom it may concern:*

Be it known that I, JAMES A. MARSH, of Cleveland, in the county of Cuyahoga and State of Ohio, have invented certain new and useful Improvements in Ovens; and I do hereby declare the following to be a full, clear, and exact description of the invention, such as will enable others skilled in the art to which it pertains to make and use it, reference being had to the accompanying drawing, which forms part of this specification.

My invention relates to domestic ovens; and it consists in applying to an oven to be used for baking purposes a supplemental air-chamber provided with inlet-pipes for admitting cold air from the outside and delivering it heated to any portion of the chamber of the oven above its base.

The object of my invention is to heat every portion of the oven equally, thereby rendering all portions equally available for the purposes desired.

In ordinary cooking-stoves the bottom of the oven will often burn the bottom of the article being baked, while the upper portion of the same article remains uncooked. On the other hand, if the article is placed upon the upper shelf of the oven, the upper portion of the article will become burned before the lower portion will become cooked. It is the intention of my device to so equalize the heat of an oven, that the bottom and top of any article will be equally as well baked either upon the upper or lower shelf.

In the drawing is shown a vertical sectional view of an ordinary cook-stove with its oven provided with my improvement.

In the said drawing, A represents the outer casing of the oven, and B the inner lining or casing, and C the chamber into which the air is taken heated and from which it is delivered to the oven above.

In an ordinary cook-stove or range the air is taken from the outside, as shown in the drawing, through gas-pipes c, which may be of any size and number desired. The air passes through these gas-pipes into the chamber C, where, by contact with the bottom of the oven A, it becomes heated. It then passes up through the flue D and is delivered at a point below the upper shelf, and, to permit its ready exit after having performed its function, I provide openings d in the upper portion of the oven, connecting the same with the drawing or exit flue of the stove.

I am aware that reservoir-stoves have been provided with a small air-heating chamber located at the front upper edge of the oven, fresh air being conveyed through the heating-chamber and discharged into the upper portion of the oven, and hence I make no claim to such construction and arrangement of parts.

What I claim is—

The combination, with an oven, of a flue or chamber, C, located beneath the oven and communicating with the outer air, and flue D, communicating at its lower end with the forward portion of the flue or chamber C, said flue being constructed and arranged to discharge heated air into the oven at a point above its base, substantially as set forth.

In testimony whereof I have signed my name to this specification, in the presence of two subscribing witnesses.

JAMES A. MARSH.

Witnesses:
  JNO. CROWELL, Jr.,
  ALBERT E. LYNCH.